United States Patent
Kazadi (10) Patent No.: US 11,150,017 B2
(45) Date of Patent: Oct. 19, 2021

(54) SOLAR CHIMNEY-BASED LIQUID DESICCATION SYSTEM WITH A THERMALLY-REGENERATING DESICCATOR

(71) Applicant: Sanza T. Kazadi, Batavia, IL (US)

(72) Inventor: Sanza T. Kazadi, Batavia, IL (US)

( * ) Notice: Subject to any disclaimer, the term of this patent is extended or adjusted under 35 U.S.C. 154(b) by 0 days.

(21) Appl. No.: 16/926,609

(22) Filed: Jul. 10, 2020

(65) Prior Publication Data
US 2020/0340742 A1    Oct. 29, 2020

Related U.S. Application Data

(63) Continuation-in-part of application No. 16/248,636, filed on Jan. 15, 2019, now abandoned.

(60) Provisional application No. 62/617,469, filed on Jan. 15, 2018.

(51) Int. Cl.
| | |
|---|---|
| *F26B 3/28* | (2006.01) |
| *F26B 21/08* | (2006.01) |
| *F26B 23/02* | (2006.01) |
| *F26B 3/04* | (2006.01) |

(52) U.S. Cl.
CPC ............ *F26B 3/286* (2013.01); *F26B 21/086* (2013.01); *F26B 23/022* (2013.01); *F26B 3/04* (2013.01)

(58) Field of Classification Search
CPC .... F26B 3/286; F26B 3/00; F26B 3/04; F26B 5/00; F26B 21/00; F26B 21/06; F26B 23/022; H02S 40/42; F16L 11/028

USPC .............................................. 34/93
See application file for complete search history.

(56) References Cited

U.S. PATENT DOCUMENTS

| | | | | |
|---|---|---|---|---|
| 1,112,203 | A | ‡ 9/1914 | Fandrey ..................... | F03D 9/35 415/4.4 |
| 2,185,760 | A | ‡ 1/1940 | Altenkirch ............. | F26B 21/083 34/396 |
| 2,609,060 | A | ‡ 9/1952 | Kearby .................. | F24F 3/1411 95/14 |

(Continued)

FOREIGN PATENT DOCUMENTS

| | | | | |
|---|---|---|---|---|
| CN | 202322420 U | ‡ 7/2012 | | |
| DE | 102012022909 A1 | ‡ 5/2014 | ............. | F26B 3/286 |

*Primary Examiner* — Stephen M Gravini
(74) *Attorney, Agent, or Firm* — Invent Capture, LLC; Samuel S. Cho (57) ABSTRACT

A novel solar chimney-based liquid desiccation system includes a solar collector, an embedded desiccator with a novel structure, and a heated chimney. The solar collector heats up an incoming external airflow with solar radiation, and mobilizes the heated air to pass through the embedded desiccator. The embedded desiccator contains a liquid solution or another content that can undergo a thermal transfer process upon contacting the heated air from the solar collector. Typically, this thermal transfer process involves desiccation of the liquid solution and vaporization of some liquid or other elements. This desiccation process may be utilized to separate liquid from remaining contents, or as a purification process. The embedded desiccator is further connected to the heated chimney with a heated inner surface to minimize undesirable reflux and condensation within the chimney structure. A liquid recovery unit may also be added to the system to collect condensed liquid after desiccation.

17 Claims, 7 Drawing Sheets

A Completed Desiccation System Based on the Novel Solar Chimney with Input and Collection Tanks

400

A Thermally-Regenerating Desiccator with a Porous Pad Inside a Desiccation Chamber, a Heat-Absorbing Exchanger, a Pooling Collector, a Pump Element, and a Loop-Back Pipe

700

(56) References Cited

U.S. PATENT DOCUMENTS

| | | | | |
|---|---|---|---|---|
| 3,436,908 A ‡ | 4/1969 | Van Delic | ............... | F03G 6/045 |
| | | | | 126/634 |
| 3,740,959 A ‡ | 6/1973 | Foss | ..................... | F24F 3/1417 |
| | | | | 62/3.4 |
| 4,069,593 A ‡ | 1/1978 | Huang | ................... | F26B 3/286 |
| | | | | 126/617 |
| 4,467,788 A * | 8/1984 | Peranio | .................. | F24S 10/60 |
| | | | | 126/636 |
| 5,168,640 A ‡ | 12/1992 | Becerra | .................... | F26B 9/08 |
| | | | | 34/166 |
| 5,220,733 A ‡ | 6/1993 | Bothe | .................... | F26B 17/20 |
| | | | | 34/180 |
| 8,365,436 B2 * | 2/2013 | Docters van Leeuwen | ................. | |
| | | | | C02F 11/12 |
| | | | | 34/467 |
| 8,449,631 B2 * | 5/2013 | Paoluccio | ................ | C10L 5/44 |
| | | | | 44/605 |
| 8,778,065 B2 ‡ | 7/2014 | Govindan | ............ | B01D 5/0027 |
| | | | | 96/242 |
| 8,823,197 B2 ‡ | 9/2014 | Klinkman | ............... | H02S 10/12 |
| | | | | 290/54 |
| 8,997,376 B2 * | 4/2015 | Carnegie | ................ | C10L 5/361 |
| | | | | 34/411 |
| 9,259,667 B2 ‡ | 2/2016 | Roch | ........................ | B01D 1/14 |
| 9,509,249 B2 * | 11/2016 | Masaryk | ................ | F24T 10/30 |
| 9,970,706 B2 ‡ | 5/2018 | Wieland | ................ | F26B 25/008 |
| 2019/0219331 A1 * | 7/2019 | Kazadi | ..................... | F26B 3/286 |
| 2019/0323132 A1 * | 10/2019 | Kazadi | ................. | B01D 61/002 |
| 2020/0340742 A1 * | 10/2020 | Kazadi | ................. | F26B 23/022 |

\* cited by examiner
‡ imported from a related application

A Novel Solar Chimney-Based Desiccation System with a Solar Collector, an Embedded Desiccator, and a Heated Chimney

The Novel Solar Chimney-Based Desiccation System with an Addition of a Liquid Recovery Condenser System

The Novel Solar Chimney-Based Desiccation System with an Addition of an Air Transfer Tube Allowing Airflow Pass Through the Liquid Recovery Condenser System Before Entering the Solar Collector

A Completed Desiccation System Based on the Novel Solar Chimney with Input and Collection Tanks

An Example of a Heat Exchanger Functioning as a Liquid Recovery Condenser System

A Novel Solar Chimney-Based Desiccation System with a Desiccator, a Solar Collector, and a Heated Chimney in a Non-Heated Desiccation Configuration

A Thermally-Regenerating Desiccator with a Porous Pad Inside a Desiccation Chamber, a Heat-Absorbing Exchanger, a Pooling Collector, a Pump Element, and a Loop-Back Pipe

SOLAR CHIMNEY-BASED LIQUID DESICCATION SYSTEM WITH A THERMALLY-REGENERATING DESICCATOR

RELATED APPLICATIONS

The present application is a continuation-in-part application (CIP) to U.S. Ser. No. 16/248,636, which was filed on Jan. 15, 2019. The contents of U.S. Ser. No. 16/248,636 are also fully incorporated by reference to the present application. Furthermore, the present application also claims priority to a US provisional application, U.S. 62/617,469, which was filed on Jan. 15, 2018, and was previously claimed priority by U.S. Ser. No. 16/248,636. The contents of U.S. 62/617,469 are fully incorporated by reference to the present application.

FIELD OF THE INVENTION

The present invention relates to environmentally-friendly desiccation systems and methods. In particular, the present invention relates to a novel solar chimney-based desiccation system that utilizes solar and environmental thermal energy in its novel structure and components to provide desiccation (e.g. water or other liquid content reduction) in an environmentally-friendly manner.

BACKGROUND OF THE INVENTION

Energy is one of the constants of life. People use energy both directly, through consumption and energy extraction from food, and through the use of energy in a variety of forms to enable other processes. The energy that an average human consumes (i.e. assuming that each person enjoys a 1000 Calorie daily diet) is 4.18 MJ/day. At a population level of seven billion humans, this amounts to a daily energy budget of at least $2.926 \times 10^{16}$ J in order to sustain the current population.

The energy requirements of the built world significantly exceed the staggering direct energy needs of people. Our current energy requirements, provided as a mix of fossil fuel, solar, wind, hydro, nuclear, hydrothermal, and other energy sources, are an estimated 20 TW of energy; meaning that the energy needs of the built world currently exceed $1.7 \times 10^{18}$ J per day. This staggering energy requirement is nearly sixty times that needed for human food consumption. Mankind's energy needs are likely to increase over time despite efficiency improvements that may somewhat offset the magnitude of ever-increasing energy needs.

Against the backdrop of the ever-increasing energy needs of modern human civilization, it can be noted that solar energy is a readily-available and abundant energy source. It is estimated that Sun delivers $1.226 \times 10^{17}$ J of solar energy per second to the Earth system, of which 27.1% is absorbed by the atmosphere—approximately $3.321 \times 10^{16}$ J per second.

Working against the absorption of energy is the loss of energy from the planet due to blackbody radiation. Earth's blackbody radiation emits the energy absorbed during the day. Earth's atmosphere itself is therefore a significant reservoir of energy, which alternately is a net absorber of energy and a net radiator of energy. One may characterize this as an "energy conduit" through which solar energy is driven. This atmospheric energy reservoir is currently completely untapped and unused in human industrial applications.

Since the mid 1800's, most scientists have thought that the use of this atmospheric energy reservoir is unfeasible due to alleged violations of the laws of thermodynamics. While the reasoning and the strict scientific conclusions may appear convincing, they are based on the notion of a closed energetic system. Because Earth is an open energetic system that constantly receives and radiates energy, however, from a thermodynamic perspective, harnessing the power of solar energy from Earth's atmosphere based on its temperature gradient changes fully complies with our current understanding of conservation of energy and our understanding of thermodynamics.

A solar chimney is an exemplary application of harnessing energy from Earth's atmosphere. Today's conventional solar chimney systems are based on millennia-old technology originating from Persia. The basic structure of the solar chimney includes two components. A first component is a solar energy collector that transforms solar energy into heat and transfers that heat to a contained quantity of air. A second component is a chimney, which is a largely vertical tube, open at both ends. The chimney enables the heated air, which becomes relatively buoyant after the heating process, to rise and exit the chimney. The movement, in turn mobilizes the air through an applicable device—home, turbine, etc. Conventional solar chimneys have been used for a variety of tasks, including ventilation, drying of food, desalination, and electrical power generation. Solar chimneys have the desirable characteristics of being structurally simple, requiring only minimal maintenance, and functioning reliably in various climactic conditions.

In recent years, researchers have demonstrated that solar chimneys can be used to generate electricity over an extended period of time. This was established using a test facility built by an American company, Enviromission, in Manzanares, Spain. A typical solar chimney design is generally restricted to a thermal gradient of less than 35° C., thus limiting the overall installation to a Carnot efficiency of approximately 10%. Coupled with mechanical efficiencies of turbines, airflows, and other factors, this severely limits the amount of energy the chimney operator may be able to extract from the airflow. As a result, strictly using these devices as sources of electrical power generation is increasingly difficult to justify when they are compared to other conventional technologies. As an example, photovoltaic solar power generation systems of similar dimensions may be able to yield significantly more usable energy than that generated by existing solar chimney designs.

Yet, solar chimneys may enable an untapped potential for a significant performance improvement for innovative designers. An overlooked area for further innovation is related to evaporative capacity of airflow in a solar chimney structure. The heat in the air flowing through a solar chimney apparatus can do work on solution in the apparatus, evaporating the liquid and removing it from an enclosed solution. Such a process can perform orders of magnitude more work in the solar chimney apparatus than the airflow because the energy comes from the air flowing through the chimney rather than from the solar energy absorbed by the chimney. Utilizing the evaporative capacity of the airflow going through a solar chimney may be a creative usage of the thermal energy embedded in the atmosphere, especially if this evaporative capacity is utilized to drive a secondary acquisition of environmental thermal energy. A new class of systems, known as "entrochemical" systems, can use a saline gradient to acquire environmental energy directly, move heat out of an enclosed system, and transform environmental thermal energy into electricity, wherein the saline gradient is established and enhanced by the evaporative force.

Solar chimneys have been used to desiccate food items by effectively removing water and transferring it to the outside environment. The desiccation is provided by creating a substantial internal airflow over racks of food. The evaporative effect of the airflow encourages the water to evaporate and the resulting vapor is carried in the airflow up and out of the evaporation chamber. These devices tend to be relatively small, typically shorter than two stories in height.

Swamp coolers humidify incoming air by using a fan to blow air over a contained body of water. Modern swamp coolers increase the surface area of the water by pumping it over a large surface area pad. The large surface area pad enables air to flow through it, thereby coming into contact with a large surface area of water. As the water passes through the pad, it induces the water to evaporate and entrains the vapor in the airflow, thereby removing it from the water. This, in turn, reduces the temperature of the water and its vapor, cooling the airflow. The water that flows into the pool from which it is being pumped then cools the pool of water.

This flow of air, among other things, enhances the cooling capacity of the water significantly, by coupling the work of the evaporation to the airflow. It is not the airflow that creates the evaporation. Rather, it is the thermal energy in the air that induces the evaporation. The flow of air entrains the evaporated vapor and removes it, shifting the dynamic equilibrium between the water and the water vapor decidedly toward the vapor, as the vapor can no longer condense on the water. The energy to generate the airflow can be enhanced by more than an order of magnitude when compared with the amount of energy required to evaporate the water. As such, this airflow may be viewed as a way of harvesting environmental heat and doing work with it on the water.

Yet when the airflow passes over the water solution and cools it, it has the knock-on effect of reducing its capacity to be evaporated. The water within the solution becomes cooler, and this lowers its vapor pressure. As a result, the evaporation may slow or stop, depending on how much water vapor is removed and how much environmental heat is restored to the solution after it is removed during evaporation.

Integrating a swamp cooler type system into a solar chimney to replace the energy required to generate air flow may seem straightforward. Yet it is also necessary to devise a method of limiting or reversing the cooling effect on the solar chimney's airflow in order to avoid reversing the buoyancy gains from the solar collector's heating; the air moving through the evaporator must experience a sufficiently small reduction in temperature when traveling through the evaporator to enable it to continue through the solar chimney with the entrained and cooled water vapor.

In order to enable efficient solar chimneys that perform desiccation, the chimney should be significantly taller than two stories. When used to evaporate liquid the amount of liquid vapor in the airflow coming from the solar chimney should be much higher than that of the incoming airflow. A practical target for the relative partial pressure of the vapor generated by evaporation at the elevated temperature is typically greater by at least 50% of the vapor pressure at the elevated temperature.

At an increased temperature and vapor concentration, the vapor in the air will condense along the length of a conventional solar chimney as it travels upward, particularly if the chimney is tall. The condensed liquid tends to drip downward and drain back into the chimney base, possibly into the original solution. Such condensation and recollection are called "reflux." This condensation creates a moisture collection problem and also pulls heat out of the airflow, which reduces its temperature and buoyancy. In CN202322420U, Liu discloses a solar chimney design applied to desalination. This design is unlikely to work effectively in a real-world environment, as it will likely be hampered by reflux causing a significant portion of the initially-evaporated liquid to drain back to the original location. Moreover, the cooling effect of reflux will reduce the nominal performance of the chimney, with longer chimneys seeing greater degradations of performance.

Another solar chimney design has been proposed in U.S. Pat. No. 8,823,197 by Klinkman. The chimney disclosed in this publication is diagonal and built on a mountainside. The proposed system includes several options for accessing a variety of heat sources and for adding humidification to the airflow. The author teaches that the airflow will result in condensation along the way, generating distilled water. As in the case with the CN202322420U publication, the reflux cooling is likely to lower the temperature in the chimney, thus reducing its effectiveness.

Klinkman teaches in U.S. Pat. No. 8,823,197 that humidified air traveling through the solar chimney has the potential to generate distilled water through a reflux process. While this is deleterious if uncontrolled along the full length of the chimney, it also reflects a potential source of clean water acquisition from saline or otherwise contaminated liquid supplies. Such a system is a humidification-dehumidification system enabled by the flow of air through the solar chimney system. As indicated above, the condensation of the water cools the air in the chimney, which reduces its buoyancy and the effectiveness of the overall device.

U.S. Pat. No. 8,778,065 teaches that a bubble column can be used to condense a condensable fluid in a bath of fluid, which may or may not be the same as that doing the condensing. The latent heat of vaporization is removed in order to enable continual condensation. While this can recover water from a humid stream of air, it does not address the humidification of the air. Additionally, it is still dependent on an externally generated energy source.

U.S. Pat. No. 9,259,667 describes a device which concentrates solutions through a humidification-dehumidification process. It is a modular system in which each module includes two chambers. The chambers are connected by a closed vapor pathway. In one chamber, using heat and material which encourages evaporation, the air is humidified, while in the second chamber it is condensed on a heat-removing heat exchanger. Solution passed through the system is concentrated. This design uses generated heat to heat the solution and enable the evaporation. Moreover, the condensing heat exchanger may or may not be powered, possibly requiring a secondary energy use.

U.S. Pat. No. 3,740,959 describes a system for humidifying and dehumidifying. This system uses a fan, a basin, a heater, and alternately a cooled set of fins to humidify or dehumidify the surrounding air, depending on the desired outcome. Like the other systems, external energy generation is needed in order to run this system.

When utilized in a humidification-dehumidification system or in a desiccation system, a solar chimney generally has two energy pathways. The first pathway involves energy coming into the chimney at the solar collector and going out through the chimney, carried by the air. The second pathway involves energy coming into the chimney at the solar collector and then going out through the walls of the chimney and through the top of the chimney, carried by heat transfer to the walls and the outward airflow from the chimney. The thermal energy is lost to the external environment in both energy pathways.

In a dehumidification process, the heat energy in the air is lost through a phase transition of the entrained vapor. The energy is passed as heat to the condensing surface. The heat transferred to the condensing surface presents an opportunity to recapture some of the lost energy in a solar chimney structure. For instance, this recaptured energy may be able to preheat the incoming airflow, thereby generating an elevated overall thermal gradient.

Solar chimneys are typically stationary devices that are either too large to move or statically connected to particular locations. As a result, during different times of the day, the solar chimney is impacted differently by solar radiation, as the relative direction from which it is emitted changes. Solar trackers are devices designed to orient a payload toward the Sun during the day. This limits the variation and maximizes the amount of radiation impinging on the payload. For solar-electric transformers and solar thermal systems, the dynamic orientation and/or angular adjustment of the payload to optimize its exposure to the Sun during the day may significantly improve the system performance.

Therefore, it may be beneficial to devise a novel solar chimney capable of removing significant amounts of liquid from a contained body of liquid in a way that limits the parasitic effect of reflux.

Furthermore, it may also be beneficial to devise a novel solar chimney that removes liquid from a contained body of liquid, minimizes inefficiencies associated with reflux, and incorporates an inexpensive and easily-manufacturable liquid reclamation system.

Moreover, it may also be beneficial to devise a novel solar chimney with a novel energy recapture component to preheat an incoming airflow before the incoming airflow enters a solar collector for improved operating efficiencies of the novel solar chimney.

It may also be beneficial to devise a novel solar chimney with an evaporator apparatus employing a large surface area and a method of returning lost thermal energy to the solution after it has been extracted by the evaporation.

It may also be desirable to devise a novel solar chimney with an embedded solar tracker to maximize the amount of solar energy captured and used during the day.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a solar chimney-based liquid desiccation system is disclosed. This solar chimney-based liquid desiccation system comprises: a solar collector capable of acquiring photonic energy and transferring some significant portion of that photonic energy into a quantity of air contained within the solar collector as thermal energy; a desiccator with an internal space to deposit a liquid solution inside through which air heated by the solar collector flows, acquiring evaporated liquid vapor as it passes through; and a heated vertical chimney, through which air and vapor rise and exit the heated, largely vertical tube at its topmost edge, the inner surface of which is largely heated beyond the dew point of the vapor traveling through.

In another embodiment of the invention, a solar chimney-based liquid desiccation system is enhanced with a liquid recovery condenser system. This solar chimney-based liquid desiccation system comprises: a solar collector capable of acquiring photonic energy and transferring at least a portion of that photonic energy into a quantity of air contained within the solar collector as thermal energy; a desiccator with an internal space to deposit a liquid solution inside through which air heated by the solar collector flows, acquiring evaporated liquid vapor as it passes through; a liquid recovery condenser system which recovers the liquid vapor in the airflow, condensing and collecting the liquid as the heated air passes through the recovery condenser system on its way through the system; and a heated, largely vertical chimney through which air and vapor rise and exit the heated vertical tube at its topmost edge, the inner surface of which is largely heated beyond the dew point of the vapor traveling through.

In another embodiment of the invention, a solar chimney-based liquid desiccation system is enhanced with a liquid recovery condenser system. This solar chimney-based liquid desiccation system comprises: a solar collector capable of acquiring photonic energy and transferring at least a portion of that photonic energy into a quantity of air contained within the solar collector as thermal energy; a desiccator operatively connected to the solar collector with an internal space to deposit a liquid solution inside through which air heated by the solar collector flows, acquiring vapor from the liquid as it passes through; a liquid recovery condenser system which recovers the evaporated liquid in the airflow, condensing and collecting the vapor as the heated air passes through the recovery condenser system on its way through the system by at least partially using air flowing through the liquid recovery condenser system to cool an interior surface and capture heat from the condensing vapor before entering the solar collector; and a vertical chimney through which air and vapor rise and exit the heated vertical tube at its topmost edge, the inner surface of which is largely heated beyond the dew point of the vapor traveling through.

In another embodiment of the invention, another solar chimney-based desiccation system is disclosed. This system comprises: a solar collector capable of acquiring photonic energy and transferring at least a portion of that photonic energy into a quantity of air contained within the solar collector as thermal energy; an embedded desiccator with an internal space to deposit a liquid solution inside and operatively connected to the solar collector to receive a solar-heated stream of air from the solar collector through a solar collector-to-desiccator pipe, wherein at least a portion of the liquid solution is vaporized after contact with the solar-heated quantity of air, which is directed into the embedded desiccator; and a heated chimney operatively connected to the embedded desiccator to receive and expel a humidified quantity of air containing vapors from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney.

Moreover, in another embodiment of the invention, another solar chimney-based desiccation system is disclosed. This system comprises: a solar collector with a surface area to accumulate and absorb solar radiation and convert the solar radiation into thermal energy, wherein the solar collector heats a quantity of air coming into the solar collector through a solar collector entrance; an embedded desiccator with an internal space to deposit a liquid solution inside and operatively connected to the solar collector to receive a solar-heated quantity of air from the solar collector through a solar collector-to-desiccator pipe, wherein at least a portion of the liquid solution is vaporized after contact with the solar-heated quantity of air, which is directed into the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system; and a heated chimney operatively connected to the embedded desiccator to receive and expel a vapor-enriched quantity of air containing vapors from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney.

In addition, in another embodiment of the invention, another solar chimney-based desiccation system is disclosed. This system comprises: a solar collector with a surface area to accumulate and absorb solar radiation and convert the solar radiation into thermal energy, wherein the solar collector heats a quantity of air coming into the solar collector through a solar collector entrance; an embedded desiccator with an internal space to deposit a liquid solution inside and operatively connected to the solar collector to receive a solar-heated quantity of air from the solar collector through a solar collector-to-desiccator pipe, wherein at least a portion of the liquid solution is vaporized after contact with the solar-heated quantity of air, which is directed into the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system; a heated chimney operatively connected to the embedded desiccator to receive and expel a vapor-enriched quantity of air containing vapors from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney; and a liquid recovery condenser system operatively connected between the embedded desiccator and the heated chimney, wherein the liquid recovery condenser system contains a cold internal surface area to cool the vapor-enriched quantity of air containing the vapors coming out of the embedded desiccator but before entering the heated chimney, wherein at least a portion of the vapors are condensed as liquid in a liquid collection container inside or operatively connected to the liquid recovery condenser system.

Furthermore, in another embodiment of the invention, another solar chimney-based desiccation system is disclosed. This system comprises: an embedded desiccator with an external air entrance to receive a quantity of unheated external air and an internal space to deposit a liquid solution inside, wherein at least a portion of the liquid solution is vaporized after contact with the quantity of unheated external air to become a vapor-enriched quantity of air, which is then directed into a solar collector operatively connected to the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system; the solar collector with a surface area to accumulate and absorb solar radiation and convert the solar radiation into thermal energy, wherein the solar collector heats the vapor-enriched quantity of air coming from the embedded desiccator; and a heated chimney operatively connected to the solar collector to receive and expel a solar-heated and vapor-enriched quantity of air containing vapors originating from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble a novel solar chimney design and a related desiccation system.

These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the Specification are not necessarily all referring to the same embodiment. Furthermore, separate or alternative embodiments are not necessarily mutually exclusive of other embodiments.

One objective of an embodiment of the present invention is to provide a novel solar chimney, which is specifically optimized for a desiccation system, minimizing inefficiencies associated with reflux to improve liquid removal efficiencies from a contained body of a liquid solution.

Another objective of an embodiment of the present invention is to provide a novel solar chimney-based desiccation system that removes liquid from a contaminated liquid supply, minimizes inefficiencies associated with reflux, and incorporates an inexpensive and easily-manufacturable liquid reclamation system.

Yet another objective of an embodiment of the present invention is to provide a novel solar chimney-based desiccation system with a subsystem that enables the temperature of the water or solution being desiccated to be stabilized at, near, or above the ambient temperature.

Yet another objective of an embodiment of the present invention is to provide a novel solar chimney-based desiccation system with a novel energy recapture component to preheat an incoming airflow before the incoming airflow enters a solar collector for improved operating efficiencies of the novel solar chimney-based desiccation system.

For the purpose of describing the invention, a term herein referred to as "desiccation" is defined as a process of vaporizing, dehumidifying, and/or drying out liquid. In various embodiments of the invention, the liquid undergoing this "desiccation" process may be water or another substance in a liquid state.

Likewise, for the purpose of describing the invention, a term herein referred to as a "desiccator" is a device designed to vaporize, dehumidify, and/or dry out liquid within the device. For example, a desiccator may vaporize a pool of water or another pool of liquid with an incoming flow or an addition of heat into the device.

As shown in FIGS. 1-7 and related descriptions, various embodiments of the present invention are focused on novel structures, components, and features that improve efficiency and performance of solar chimney-based desiccation. Apparatuses described herein may operate as an integrated solar chimney and dehumidification (i.e. airflow-based drying) system that accommodates efficient and effective removal of water or another liquid from an effluent using solar and available environmental energy nearby.

A thermally-regenerating desiccator is a novel desiccator with a unique structure that enables the re-acquisition of thermal energy by the water or solution being dried after it has been removed due to evaporation. Unlike a conventional desiccator in which water does not move, or a swamp cooler in which the cooled water is intermingled with the solution to create a pool of cooled water, the novel, thermally-regenerating desiccator moves the cooled water into a heat-absorbing exchanger to enable the cooled water to absorb heat from the environment. Once heated, the re-heated water then flows back into the airflow. This novel structure and functionality of the thermally-regenerating desiccator, which can be integrated into at least some embodiments of the solar chimney-based desiccation system, has the effect of stabilizing the temperature of the water and therefore stabilizing its ability to vaporize in the airflow.

Figure 1:
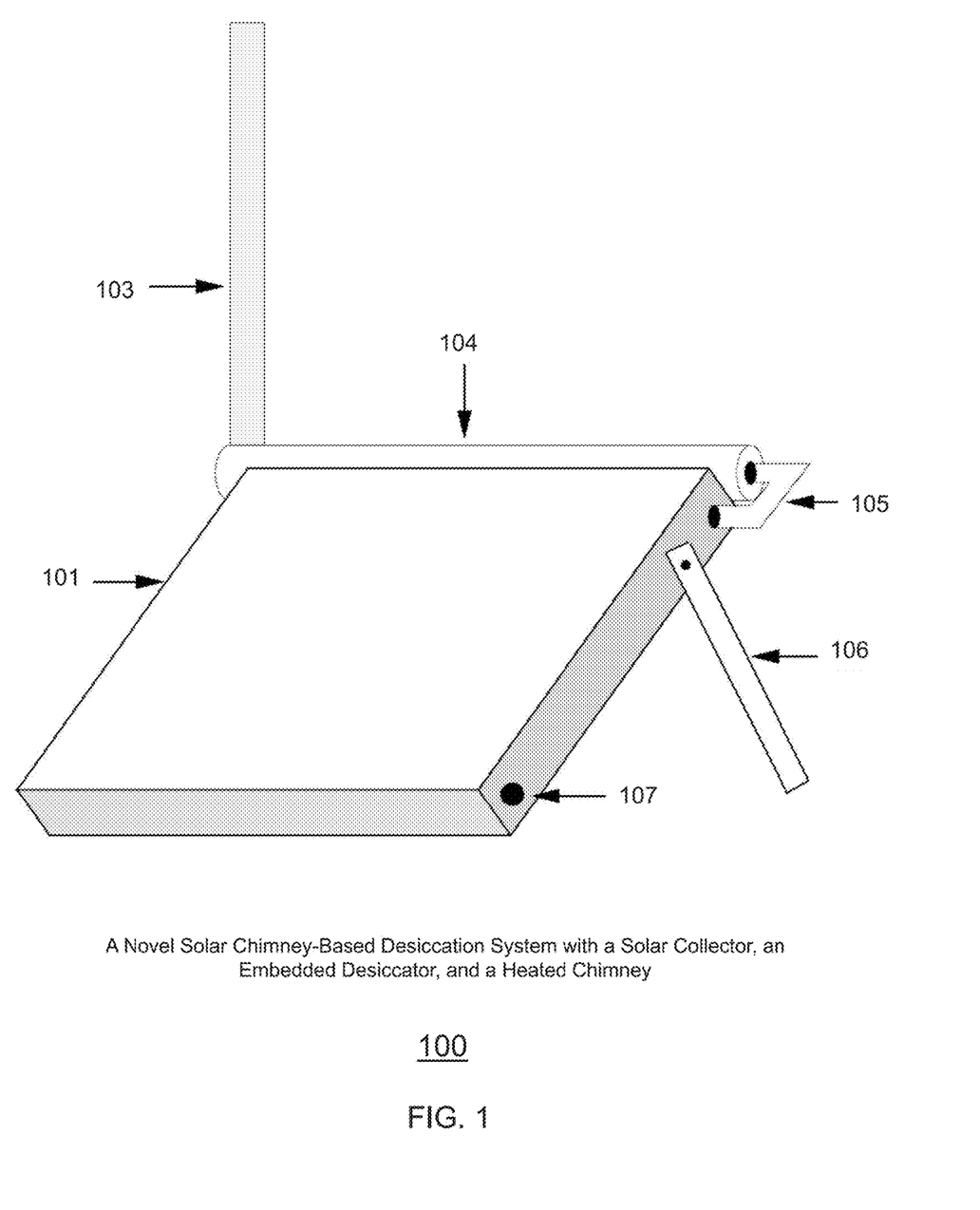
FIG. 1 shows a novel solar chimney-based desiccation system with a solar collector, an embedded desiccator, and a heated chimney, in accordance with an embodiment of the invention.

FIG. 1 shows a novel solar chimney-based desiccation system (100) with a solar collector (101), an embedded desiccator (104), and a heated chimney (103), in accordance with an embodiment of the invention. In a preferred embodiment of the invention, the solar collector (101) is configured to absorb solar radiation during daylight hours and to transform the solar radiation into thermal energy. Furthermore, in some embodiments of the invention, a solar collector angle adjuster (106) may be utilized to tilt or adjust the surface angle of the solar collector (101) to optimize its solar radiation reception efficiency relative to the current orientation of the Sun. In addition, in some embodiments of the invention, the solar collector (101) may integrate a solar tracker to further optimize its solar radiation reception efficiency relative to the current orientation of the Sun.

The thermal energy converted by the solar collector (101) from the solar radiation is then utilized to heat a quantity of air enclosed inside the solar collector (101). As the enclosed column of air warms up, it becomes buoyant and expands its volume upward. Simultaneously, the heated chimney warms the air contained therein, increasing its temperature and buoyancy. This buoyancy allows the warmed air inside the solar collector (101) to be directed into an embedded desiccator (104) as the air in the chimney rises and exits.

As illustrated in FIG. 1, the embedded desiccator (104) contains liquid solution part of which is to be converted into vapor. The liquid solution contained in the embedded desiccator (104) interacts with the incoming flow of the warmed air originating from the solar collector (101) through a solar collector-to-desiccator pipe (105). The incoming warmed air from the solar collector (101) is relatively low vapor content with low entrained vapor, compared to the equilibrium vapor pressure of the solution inside the embedded desiccator (104). Therefore, when the liquid solution inside the embedded desiccator (104) is brought into contact with the incoming warmed air through the solar collector-to-desiccator pipe (105), the liquid in the solution expeditiously evaporates into the air inside the embedded desiccator (104). This raises the vapor content of the air inside the embedded desiccator (104), and significantly increases the vapor content of the incoming warmed air, as it passes through the embedded desiccator (104). This particular component configuration and the related functionality of the embedded desiccator (104) in the solar chimney-based desiccation system (100) are part of novel aspects of the present invention, relative to conventional solar chimney designs.

The high vapor content air inside the embedded desiccator (104) then moves through a heated chimney (103) and exits out of the novel solar chimney-based desiccation system (100) towards an external atmosphere. In the preferred embodiment of the invention, the interior surface of the heated chimney (103) is sufficiently heated to reduce or eliminate reflux, which is an undesirable phenomenon that causes operating inefficiencies in conventional solar chimney designs due to frequent liquid condensation.

Furthermore, the heating of the interior surface of the heated chimney (103) increases thermal energy to the vapor-infused air passing through the novel solar chimney-based desiccation system (100), thus enabling the egressing air to become additionally buoyant. The interior surface heating of the chimney can be achieved by electrically-powered heating, direct solar heating of the chimney, or heating with other available thermal energy sources from the external environment near the novel solar chimney-based desiccation system (100). By heating the chimney that functions as an air exit pipe, the novel solar chimney-based desiccation system (100) becomes a thermal transistor through which airflow and entropy transfer are enabled by a seemingly small energy input to an open physical system capable of attracting useful external thermal energy.

In the preferred embodiment of the invention, the novel solar chimney-based desiccation system (100), as illustrated in FIG. 1, allows outside air to enter an open physical desiccation system through a solar collector entrance (107), wherein the air is heated within the solar collector (101). Then, the heated air acquires liquid vapor in the embedded desiccator (104) and becomes vapor-infused, and exits the open physical desiccation system through the heated chimney (103).

In contrast, unlike the novel solar chimney-based desiccation system (100) as illustrated in FIG. 1, conventional solar chimney implementations typically exhibit low operating efficiencies due to the reflux phenomenon and other structural shortcomings. In particular, interior walls of conventional solar chimneys suffer from reflux-related moisture condensation and unintended thermal cooling by the external environment. As the processed air travels upward in a conventional solar chimney, a substantial portion of the vapors within the processed air condenses on the conventional solar chimney's interior surface due to reflux, which in turn impedes the velocity and the efficiency of air outflows from the conventional solar chimneys.

Figure 2:
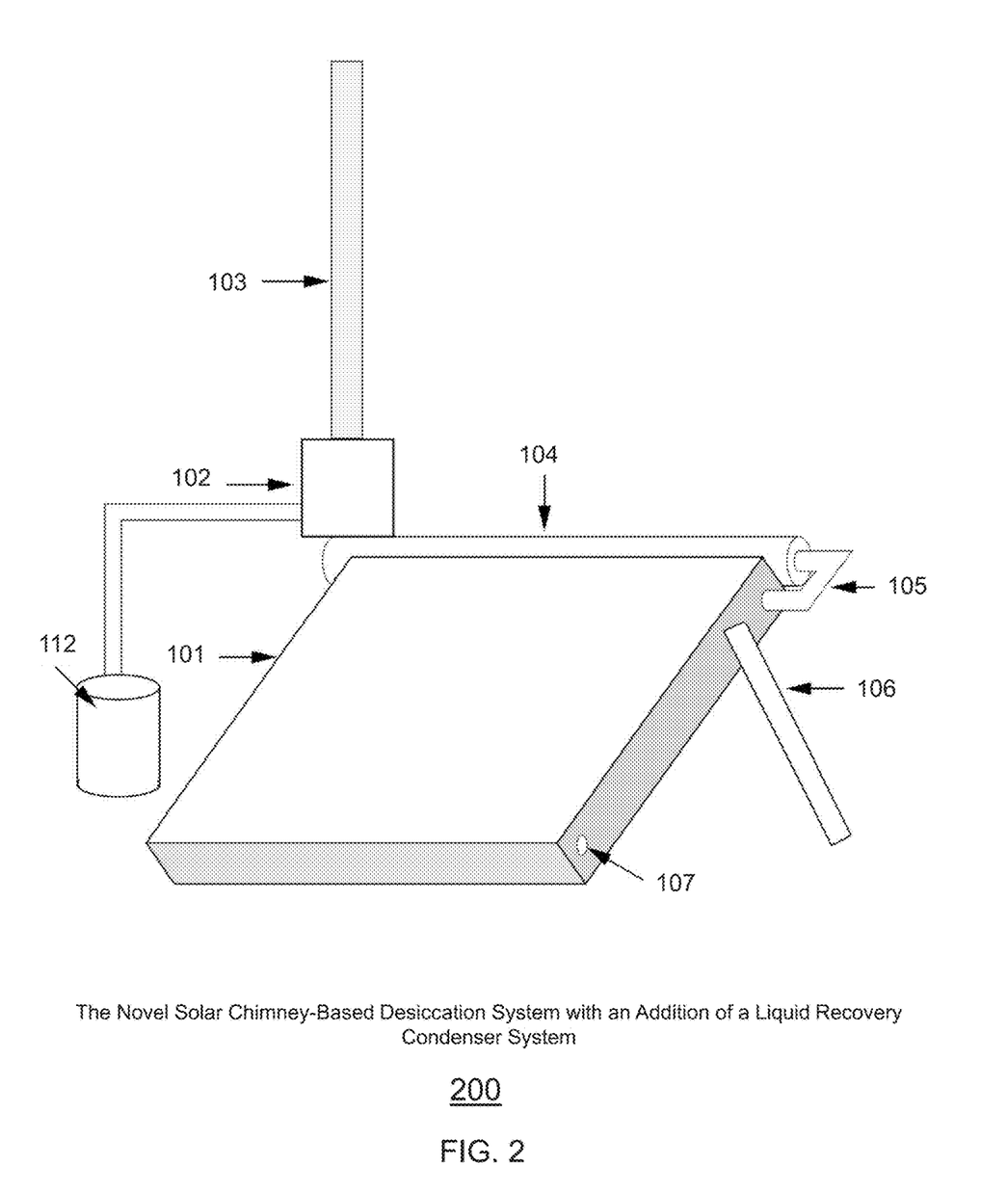
FIG. 2 shows the novel solar chimney-based desiccation system with an addition of a liquid recovery condenser system, in accordance with an embodiment of the invention.

FIG. 2 shows a second novel solar chimney-based desiccation system (200) with an addition of a liquid recovery condenser system (102) to the first novel solar chimney-based desiccation system (100) previously illustrated in FIG. 1, in accordance with another embodiment of the invention. In this embodiment as shown in FIG. 2, the liquid recovery condenser system (102) is installed between the embedded desiccator (104) and the heated chimney (103). The liquid drains into a collection chamber (112)

In the liquid recovery condenser system (102), condensable vapors present in the airflow come into contact with a colder surface, which facilitates a thermal energy transfer from the airflow to the colder surface. This energy transfer causes the condensable vapors to condense into a liquid state, which is then collected in a collection chamber (112) after being periodically or continuously transferred out of the container through a condensation exit hole in the liquid recovery condenser system (102).

In some circumstances, the installation of the liquid recovery condenser system (102) may further improve the operating capacity and the efficiency of the second novel solar chimney-based desiccation system (200) by proactively and preemptively collecting condensed liquid that was temporarily vaporized in the embedded desiccator (104), before the airflow is further mobilized to the heated chimney (103) as an exit to the external environment. Yet in other circumstances, the installation of the liquid recovery condenser system (102) may be unnecessary, and a desiccation device designer may choose to implement the structure embodied in the first novel solar chimney-based desiccation system (100) instead, as previously illustrated in FIG. 1.

In the embodiment of the invention as shown in FIG. 2, the solar collector (101) is configured to absorb solar radiation during daylight hours and to transform the solar radiation into thermal energy. Furthermore, in some embodiments of the invention, a solar collector angle adjuster (106) and/or an integrated solar tracker may be utilized to tilt or adjust the surface angle of the solar collector (101) to optimize its solar radiation reception efficiency relative to the current orientation of the Sun. The thermal energy converted by the solar collector (101) from the solar radiation is then utilized to heat a quantity of air enclosed inside the solar collector (101). As the enclosed quantity of air warms up, it becomes buoyant and expands its volume upward. This buoyancy allows the warmed air inside the solar collector (101) to be directed into an embedded desiccator (104).

As illustrated in FIG. 2, the embedded desiccator (104) contains a liquid solution from which a quantity of liquid is to be converted into vapor. The liquid solution contained in the embedded desiccator (104) interacts with the incoming flow of the warmed air originating from the solar collector (101) through a solar collector-to-desiccator pipe (105). The incoming warmed air from the solar collector (101) is relatively dry with low vapor content with low entrained vapor, compared to the equilibrium vapor pressure of the solution inside the embedded desiccator (104). Therefore, when the liquid solution inside the embedded desiccator (104) is brought into contact with the incoming warmed air through the solar collector-to-desiccator pipe (105), the liquid in the solution expeditiously evaporates into the air inside the embedded desiccator (104). This increases the vapor content of the air inside the embedded desiccator (104) as it passes through.

The vapor-infused air inside the embedded desiccator (104) then passes through the liquid condenser recovery system (102) that contains a colder surface to activate a thermal energy transfer from the airflow to the colder surface. This energy transfer causes the condensable vapors contained in the humidified air to condense into liquid, which is then collected in a liquid collection container (112) after being periodically or continuously transferred out of the recovery system through a condensation exit hole in the liquid recovery condenser system (102). Subsequently, the airflow moves through the heated chimney (103) and exits out of the second novel solar chimney-based desiccation system (200) towards an external atmosphere. In a preferred embodiment of the invention, the interior surface of the heated chimney (103) is sufficiently heated to reduce or eliminate reflux, which is an undesirable phenomenon that causes operating inefficiencies in conventional solar chimney designs due to frequent liquid condensation inside a conventional solar chimney.

Furthermore, the heating of the interior surface of the heated chimney (103) increases thermal energy to the vapor-infused air passing through the second novel solar chimney-based desiccation system (200), thus enabling the egressing air to become additionally buoyant. The interior surface heating of the chimney can be achieved by electrically-powered heating, direct solar heating of the chimney, or heating with other available thermal energy sources from the external environment near the second novel solar chimney-based desiccation system (200). By heating the chimney that functions as an air exit pipe, the second novel solar chimney-based desiccation system (200) becomes a thermal transistor through which airflow and entropy transfer are enabled by a seemingly-smaller energy input to an open physical system capable of attracting useful external energy sources.

As illustrated in FIG. 2, the second novel solar chimney-based desiccation system (200) allows outside air to enter an open physical desiccation system through a solar collector entrance (107), wherein the air is heated within the solar collector (101). Then, the heated air acquires vapors in the embedded desiccator (104) and becomes vapor-infused, after which condensed vapors can be preemptively collected by the liquid recovery condenser system (102), while the processed airflow exits the open physical desiccation system through the heated chimney (103). In some embodiments of the invention, the addition of the liquid recovery condenser system (102) may improve operating capacity and efficiency of a solar chimney-based desiccation system.

Figure 3:
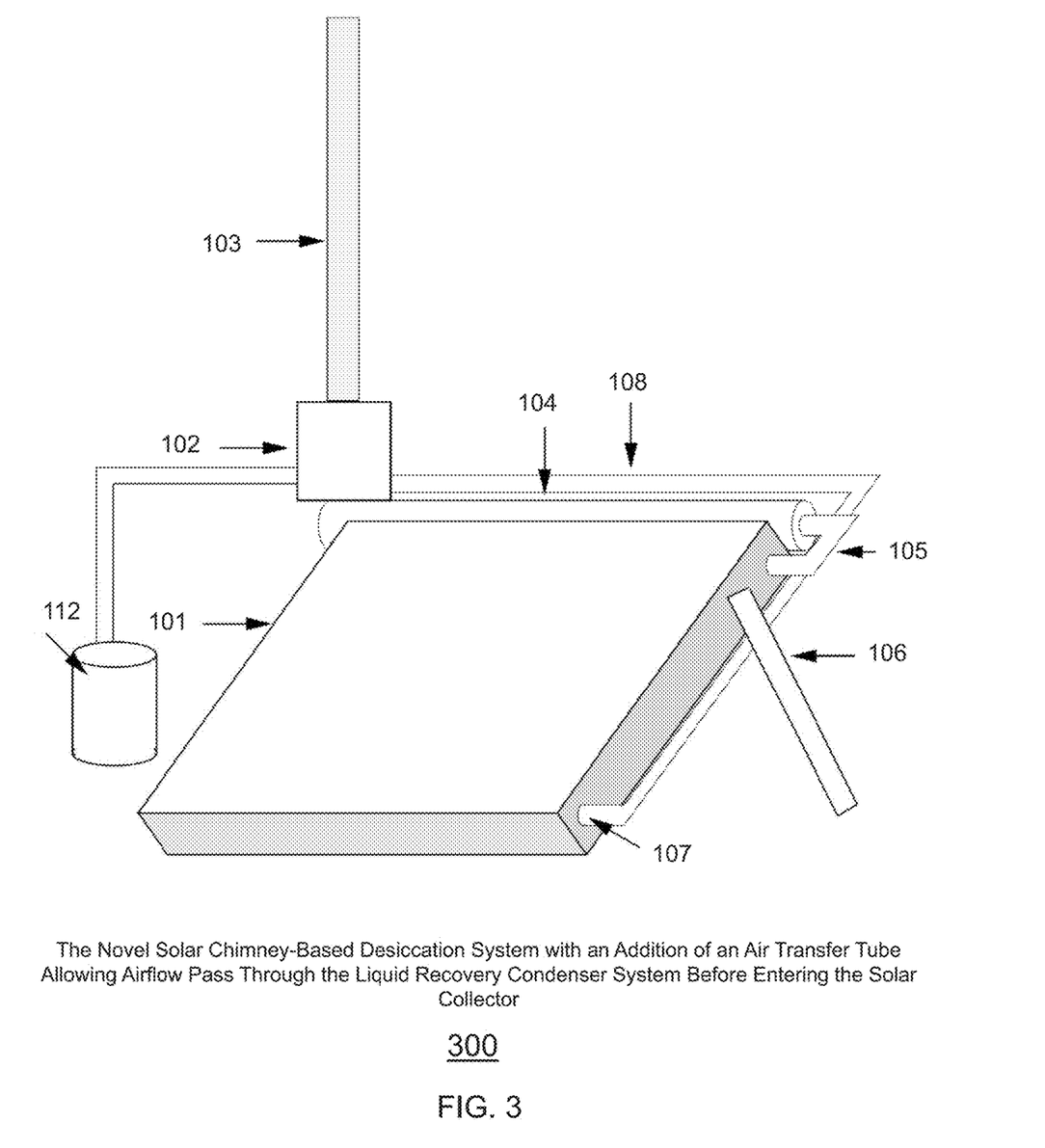
FIG. 3 shows the novel solar chimney-based desiccation system with an addition of an air transfer tube that allows an airflow to pass through the liquid recovery condenser system before entering the solar collector, in accordance with an embodiment of the invention.

FIG. 3 shows a third novel solar chimney-based desiccation system (300) with an addition of an air transfer tube (108) that allows an airflow to pass through the liquid recovery condenser system (102) before entering the solar collector (101), in accordance with an embodiment of the invention. In this embodiment of the invention as shown in FIG. 3, the liquid recovery condenser system (102) is installed between the embedded desiccator (104) and the heated chimney (103), and also includes a novel air conduit between the liquid recovery condenser system (102) and the solar collector (101) with the air transfer tube (108).

In the liquid recovery condenser system (102), condensable vapors present in the airflow come into contact with a colder surface, which facilitates a thermal energy transfer from the airflow to the colder surface. This energy transfer causes the condensable vapors to condense into a liquid state, which is then collected in a liquid collection container (112) after being periodically or continuously transferred out of the container through a condensation exit hole in the liquid recovery condenser system (102). This condensed liquid collection process enables the third novel solar chimney-based desiccation system (300) to recover some of the liquid that has been evaporated in the embedded desiccator (104).

Importantly, in the embodiment of the invention as shown in FIG. 3, the air transfer tube (108) in the third novel solar chimney-based desiccation system (300) allows an incoming airflow into the desiccation system from outside to also pass through the liquid recovery condenser system (102) first, before reaching the solar collector (101) for solar energy-based heating of the air. Preferably, the air transfer tube (108) is a separate piping element from an exhaust piping element that carries out a processed column of air from the embedded desiccator (104) to the heated chimney (103) through the liquid recovery condenser system (102).

In some instances, utilizing the air transfer tube (108) may enable pre-heating of the incoming airflow through an ambient exposure to the thermal energy (i.e. heat) transferred out of the vapors near the exhausting piping element in the liquid recovery condenser system (102), thus providing an efficient energy recovery feedback loop in the third novel solar chimney-based desiccation system (300). The pre-heated incoming airflow is then directed to the solar collector (101) via the solar collector entrance (107) for solar heating, followed by a desiccation process in the embedded desiccator (104), and then by an exhaust process through the liquid recovery condenser system (102) and the heated chimney (103), as described previously for FIG. 2. The pre-heating of the incoming airflow by utilizing the air transfer tube (108) allows a higher starting ambient air temperature before heating up the air inside the solar collector (101), which improves the overall system efficiency for the novel solar chimney-based desiccation.

Figure 5:
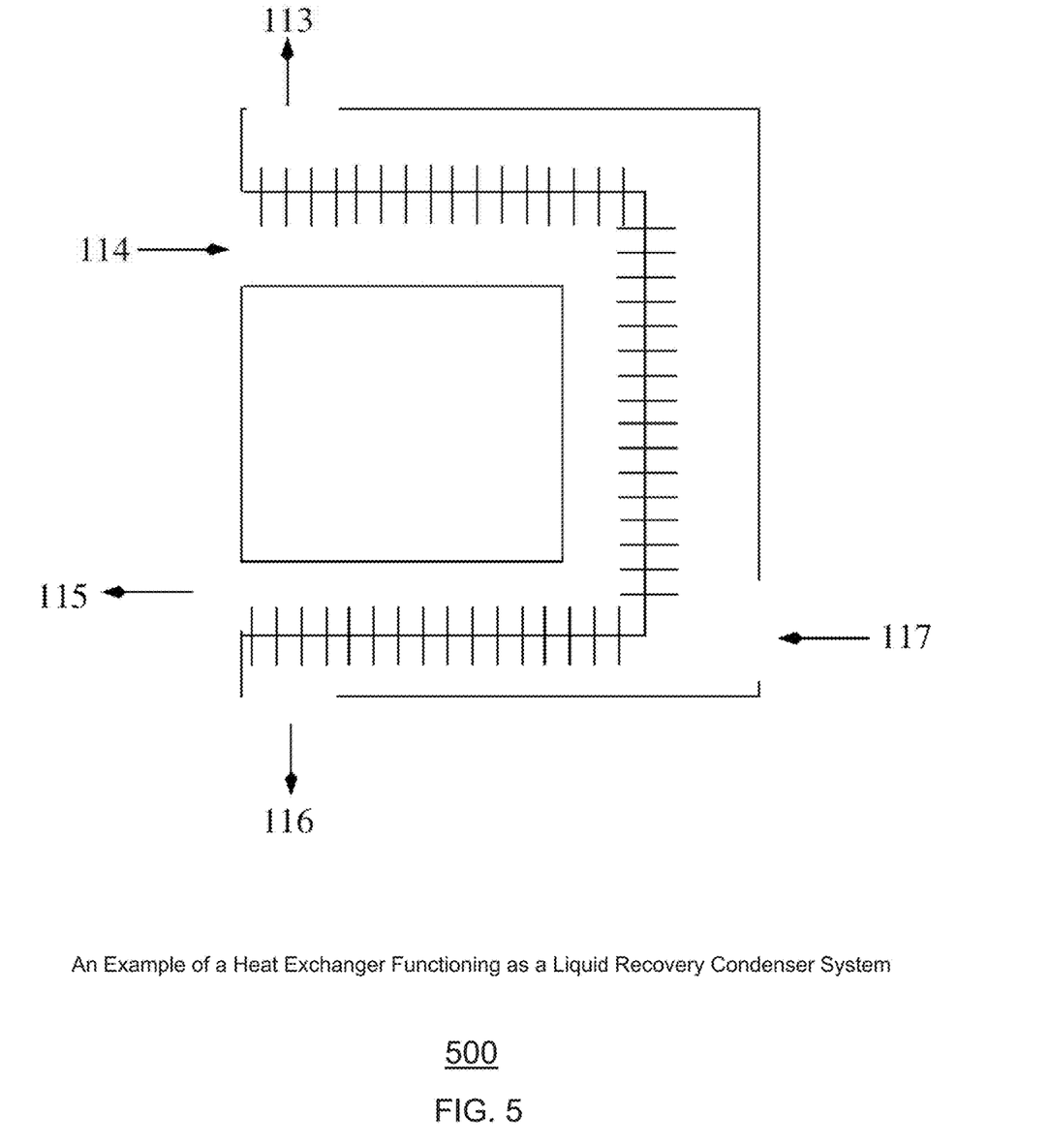
FIG. 5 shows an example of a heat exchanger functioning as a liquid recovery condenser system, in accordance with an embodiment of the invention.

A preferred embodiment (500) of the liquid recovery condenser system is illustrated in FIG. 5 as a heat exchanger. In this embodiment, air flows through the heat exchanger from 114 to 115, cooling a surface and carrying away heat from that surface. Enriched air containing a condensable component passes over the other side of the surface from 117 to 113, heating the surface and condensing the condensable component on the surface. The condensable component, now liquid, drips down and goes out through 116 at the bottom of the heat exchanger.

Preferably, the liquid recovery condenser system utilizes two fluid flows. The air enters the liquid recovery condenser system through an opening (114), passes over a surface separating the cooler air from the warm vapor-infused air, and exits through a second opening (115). Simultaneously, the warm vapor-infused air enters the liquid recovery condenser system through an opening hermetically (117) and passes on the other side of the surface separating the cold and warm chambers of the liquid recovery condenser system. Liquid condenses on the cooled surface and drains to the bottom of the liquid recovery condenser system, exiting at through an opening in the bottom (116). The warm vapor-infused air continues out of the liquid recovery condenser system through an opening (113).

Figure 4:
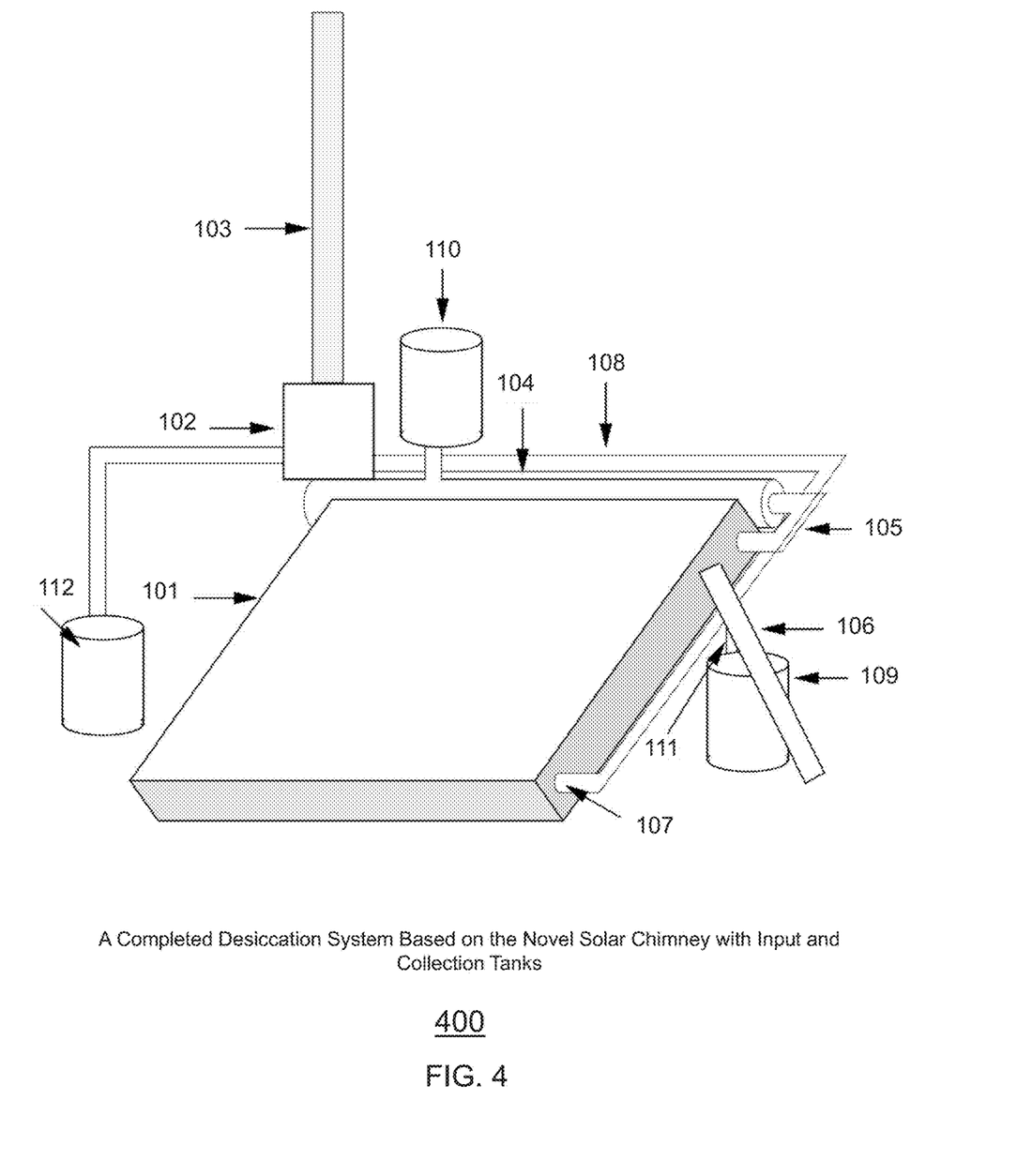
FIG. 4 shows a completed desiccation system based on the novel solar chimney with input and collection tanks, in accordance with an embodiment of the invention.

FIG. 4 shows a completed desiccation system (400) based on the novel solar chimney design embodied in FIG. 3, with an input tank (110) for the embedded desiccator (104), an output tank (109) for the embedded desiccator (104), and an output pipe (111) connecting the output tank (109) to the embedded desiccator.

In this embodiment of the invention, the input tank (110) is utilized to insert a liquid solution into the embedded desiccator (104), while the output tank (109) is utilized to drain a remaining, desiccated, and/or processed product out of the embedded desiccator (104). Preferably, the input tank (110) is positioned above the embedded desiccator (104) to be gravity-fed, and the output tank (109) and the output pipe (111) are generally positioned below the embedded desiccator (104) to enable gravity-assisted drainage of the remaining, desiccated, and/or processed product out of the embedded desiccator (104) without the use of an additional pump element. In other embodiments of the invention, pump elements may be necessary or desirable to accelerate liquid insertion or output drainage, at the discretion of a desiccation system construction designer.

Figure 6:
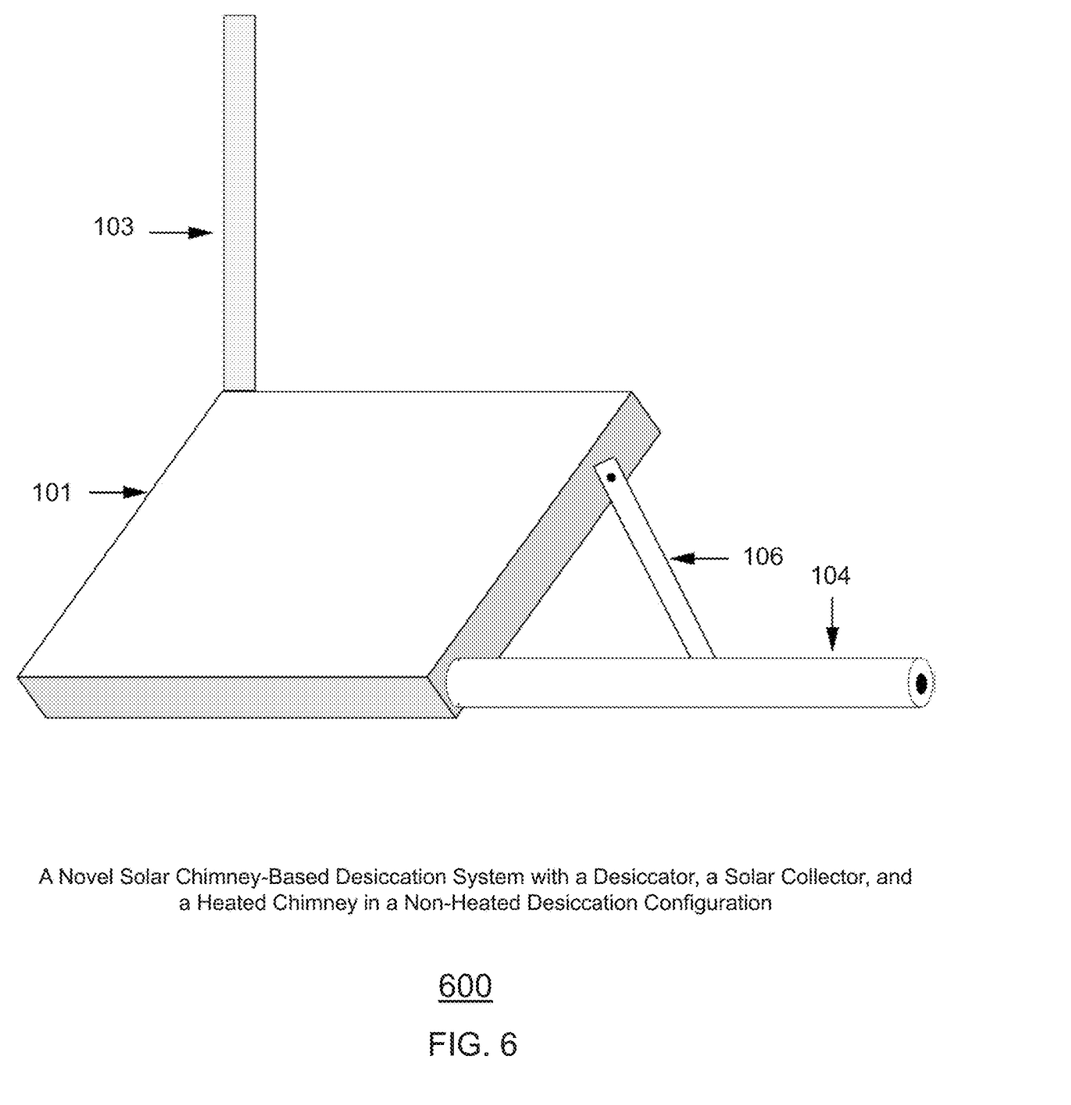
FIG. 6 shows a novel solar chimney-based desiccation system with a desiccator, a solar collector, and a heated chimney in a non-heated desiccation configuration, in accordance with an embodiment of the invention.

FIG. 6 shows an alternate embodiment (600) of a novel solar chimney-based desiccation system with the embedded desiccator (104), the solar collector (101), and the heated chimney (103) in a non-heated desiccation configuration. Optionally, this alternate embodiment (600) may also include a solar collector angle adjuster (106). In this embodiment of the invention, air enters the embedded desiccator (104) from an external environment, and comes into contact with a pool of liquid. A portion of the liquid vaporizes and is entrained in the airflow to form an enriched airflow with vaporized molecules.

The embedded desiccator (104) is operatively attached to the solar collector (101), enabling air to flow freely between the two components. The enriched air then enters the solar collector (101) where photonic energy is absorbed and transformed into heat. Some quantity of the heat is transferred to the enriched air flow.

As shown in FIG. 6, the heated chimney (103) is operatively attached to the solar collector (101) so that air may flow freely between them. The warm enriched air continues into the heated chimney (103) from the solar collector (101), rising through the chimney and exiting from the topmost opening into the environment. The heated chimney (103) is heated above the dew point of the liquid vapor traveling through, preventing condensation of the vapor as it moves through the heated chimney (103).

Figure 7:
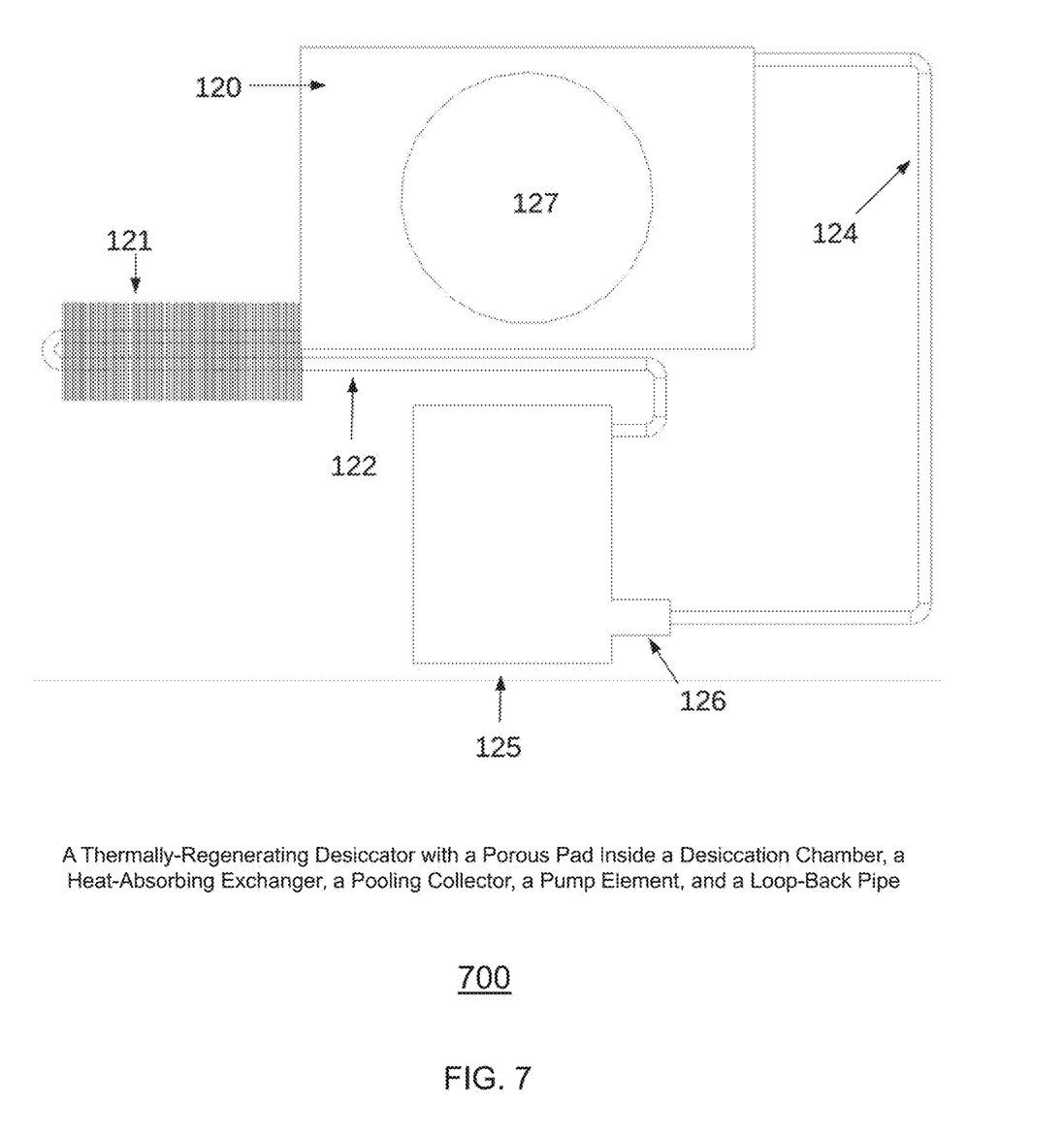
FIG. 7 shows a thermally-regenerating desiccator with a porous pad inside a desiccation chamber, a heat-absorbing exchanger, a pooling collector, a pump element, and a loop-back pipe, wherein the thermally-regenerating desiccator is a new type of the embedded desiccator as element 104 in FIGS. 1-4 and FIG. 6.

FIG. 7 illustrates an embodiment of a thermally-regenerating desiccator (700), which incorporates several novel structures and features, compared to a conventional desiccator design. In a preferred embodiment of the invention, the thermally-regenerating desiccator (700) is utilized as a new type of the embedded desiccator (104), and is referred to herein interchangeably as an "embedded thermally-regenerating desiccator." Preferably, the thermally-regenerating desiccator (700) is configured to fit into the solar chimney-based desiccation system as "element 104" in various embodiments (i.e. 100, 200, 300, 400, 600) of the system, as illustrated in FIGS. 1-4 and FIG. 6. In the thermally-regenerating desiccator (700) as shown in FIG. 7, air flows through the desiccation chamber (120) by entering and exiting through two airflow ports (127) located opposite one-another in the desiccation chamber (120). A porous pad onto which liquid is pumped is inside the desiccation chamber (120). Water flowing over the porous pad flows into the bottom of the desiccation chamber (120) and into a fluid collection pathway (122). This fluid collection pathway (122) is operatively connected to a heat-absorbing exchanger (121) which draws heat from the environment into the fluid flowing through the fluid collection pathway (122). The fluid collection pathway (122) and heat-absorbing exchanger (121) are sized so as to bring the water or solution flowing through it approximately to the ambient temperature, in the environment and with the airflow rate and solution concentration being used. The water or solution flows into a pooling collector (125) where the bulk of the solution is housed. Finally, a pump element (126) pumps the water or solution back to the desiccation chamber (120) through a loop-back pipe (124).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A solar chimney-based desiccation system comprising:
    a solar collector with a surface area to accumulate and absorb solar radiation and convert the solar radiation into thermal energy, wherein the solar collector heats a quantity of air coming into the solar collector through a solar collector entrance;
    an embedded desiccator with an internal space to deposit a liquid solution inside and operatively connected to the solar collector to receive a solar-heated quantity of air from the solar collector through a solar collector-to-desiccator pipe, wherein at least a portion of the liquid solution is vaporized after contact with the solar-heated quantity of air, which is directed into the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system; and
    a heated chimney operatively connected to the embedded desiccator to receive and expel a vapor-enriched quantity of air containing vapors from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney.

2. The solar chimney-based desiccation system of claim 1, further comprising an input tank operatively connected to the embedded desiccator to deposit the liquid solution, wherein the input tank is located above the embedded desiccator to enable gravity feeding of the liquid solution.

3. The solar chimney-based desiccation system of claim 1, further comprising an output tank operatively connected to the embedded desiccator through an output pipe to drain a desiccated or processed remainder of the liquid solution, wherein the output tank is located below the embedded desiccator to enable gravity-assisted draining of the desiccated or processed remainder of the liquid solution.

4. The solar chimney-based desiccation system of claim 1, wherein the interior surface of the heated chimney is heated by an electric heater, a fuel furnace, solar insolation, or a combination thereof.

5. The solar chimney-based desiccation system of claim 1, further comprising a solar tracker operatively connected to the solar collector to enable a dynamic adjustment of the solar collector's orientation to maximize insolation from Sun during daylight hours.

6. The solar chimney-based desiccation system of claim 1 wherein the embedded-desiccator is a thermally-regenerating desiccator.

7. A solar chimney-based desiccation system comprising:
    a solar collector with a surface area to accumulate and absorb solar radiation and convert the solar radiation into thermal energy, wherein the solar collector heats a quantity of air coming into the solar collector through a solar collector entrance;
    an embedded desiccator with an internal space to deposit a liquid solution inside and operatively connected to the solar collector to receive a solar-heated quantity of air from the solar collector through a solar collector-to-desiccator pipe, wherein at least a portion of the liquid solution is vaporized after contact with the solar-heated quantity of air, which is directed into the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system;
    a heated chimney operatively connected to the embedded desiccator to receive and expel a vapor-enriched quantity of air containing vapors from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney; and
    a liquid recovery condenser system operatively connected between the embedded desiccator and the heated chimney, wherein the liquid recovery condenser system contains a cold internal surface area to cool the vapor-enriched quantity of air containing the vapors coming out of the embedded desiccator but before entering the heated chimney, wherein at least a portion of the vapors are condensed as liquid in a liquid collection container inside or operatively connected to the liquid recovery condenser system.

8. The solar chimney-based desiccation system of claim 7, further comprising an air transfer tube connecting the solar collector entrance and the liquid recovery condenser system to preheat the quantity of air coming into the solar collector with a thermal energy recovered during condensation of the vapors coming out of the embedded desiccator, wherein the air transfer tube provides a heat recapture and an energy-conserving feedback loop to the solar chimney-based desiccation system.

9. The solar chimney-based desiccation system of claim 7, further comprising an input tank operatively connected to the embedded desiccator to deposit the liquid solution, wherein the input tank is located above the embedded desiccator to enable gravity feeding of the liquid solution.

10. The solar chimney-based desiccation system of claim 7, further comprising an output tank operatively connected to the embedded desiccator through an output pipe to drain a desiccated or processed remainder of the liquid solution, wherein the output tank is located below the embedded desiccator to enable gravity-assisted draining of the desiccated or processed remainder of the liquid solution.

11. The solar chimney-based desiccation system of claim 7, wherein the interior surface of the heated chimney is heated by an electric heater, a fuel furnace, or by solar insolation.

12. The solar chimney-based desiccation system of claim 7, further comprising a solar tracker operatively connected to the solar collector to enable a dynamic adjustment of the solar collector's orientation to maximize insolation from Sun during daylight hours.

13. The solar chimney-based desiccation system of claim 7 wherein the embedded-desiccator is a thermally-regenerating desiccator.

14. A solar chimney-based desiccation system comprising:
an embedded desiccator with an external air entrance to receive a quantity of unheated external air and an internal space to deposit a liquid solution inside, wherein at least a portion of the liquid solution is vaporized after contact with the quantity of unheated external air to become a vapor-enriched quantity of air, which is then directed into a solar collector operatively connected to the embedded desiccator, and wherein the embedded desiccator additionally incorporates a heat-absorbing exchanger and at least one of a fluid collection pathway, a pooling collector, a pump element, and a loop-back pipe to improve a fluid evaporation efficiency of the solar chimney-based desiccation system;
the solar collector with a surface area to accumulate and absorb solar radiation and convert the solar radiation into thermal energy, wherein the solar collector heats the vapor-enriched quantity of air coming from the embedded desiccator; and
a heated chimney operatively connected to the solar collector to receive and expel a solar-heated and vapor-enriched quantity of air containing vapors originating from the liquid solution to an external environment outside the solar chimney-based desiccation system, wherein an interior surface of the heated chimney is heated above a dew point of the vapors to prevent reflux and condensation of the vapors alongside the interior surface of the heated chimney, as the vapors rise through the heated chimney.

15. The solar chimney-based desiccation system of claim 14, wherein the interior surface of the heated chimney is heated by an electric heater, a fuel furnace, solar insolation, or a combination thereof.

16. The solar chimney-based desiccation system of claim 14, further comprising a solar tracker operatively connected to the solar collector to enable a dynamic adjustment of the solar collector's orientation to maximize insolation from Sun during daylight hours.

17. The solar chimney-based desiccation system of claim 14, wherein the embedded desiccator is a thermally-regenerating desiccator.

* * * * *